United States Patent [19]

Cherukuri et al.

[11] Patent Number: 4,490,395

[45] Date of Patent: Dec. 25, 1984

[54] CHEWING GUM WITH IMPROVED STABILITY

[75] Inventors: S. Rao Cherukuri, Towaco, N.J.; Kenneth P. Bilka, Floral Park, N.Y.; Frank Hriscisce, Astoria, N.Y.; Dominic J. Piccolo, Brooklyn, N.Y.

[73] Assignee: Warner-Lambert Company, Morris Plains, N.J.

[21] Appl. No.: 485,685

[22] Filed: Apr. 18, 1983

[51] Int. Cl.³ .............................................. A23G 3/30
[52] U.S. Cl. ............................................. 426/3; 426/6
[58] Field of Search ......................................... 426/3-6

[56] References Cited

U.S. PATENT DOCUMENTS

| | | | |
|---|---|---|---|
| 3,573,933 | 4/1971 | MacLeod | 426/6 |
| 3,974,293 | 8/1976 | Witzel | 426/4 |
| 3,995,064 | 11/1976 | Ehrgott et al. | 426/3 |
| 4,187,320 | 2/1980 | Koch et al. | 426/3 |
| 4,241,091 | 12/1980 | Stroz et al. | 426/4 |
| 4,352,822 | 10/1982 | Cherukuri et al. | 426/3 |
| 4,387,108 | 6/1983 | Koch et al. | 426/4 |

FOREIGN PATENT DOCUMENTS 88096 1/1977 Japan .

*Primary Examiner*—Jeanette Hunter
*Attorney, Agent, or Firm*—Gary M. Nath; Daniel Scola

[57] ABSTRACT

A chewing gum composition having extended flavor taste stability and decreased auto-oxidative potential which comprises a chewing gum composition containing a flavoring agent and a chewing gum base prepared from an elastomer mixture of isobutylene isoprene copolymer and polyisobutylene, waxes, elastomer solvent, polyvinyl acetate and glyceryl monostearate.

12 Claims, No Drawings

CHEWING GUM WITH IMPROVED STABILITY

The present invention relates to chewing gum compositions and more particularly to chewing gum compositions having a decreased auto-oxidative potential resulting in chewing gum compositions having improved stability.

Chewing gums generally contain a water-insoluble gum base, a water insoluble flavoring liquid and water soluble sweeteners such as sucrose and corn syrup or in sugarless gum, sorbitol, mannitol and artificial sweeteners. Also incorporated within the gum base may be plasticizers or softeners to improve consistency and texture of the gum. The gum base generally contains a natural rubber gum base, a synthetic rubber gum and or mixtures thereof. When synthetic gum bases are employed, a readily available and preferred elastomer component has been the styrene-butadiene copolymer (SBR).

Several deficiencies with conventional chewing gums using styrene-butadiene copolymer elastomers have existed which deficiencies have heretofore only been partially eliminated.

One such deficiency is the long term stability of chewing gums containing SBR, notably their lack of long term shelf stability. Various attempts have been made to improve this difficulty including use of antioxidants as well as natural gums such as chicle. Antioxidants have not been completely successful and natural gums are expensive to use. Polyvinyl acetate is an excellent stable material and has been used as a substitute for several natural gums used in chewing gums. When polyvinyl acetate is used with SBR elastomers in amounts above about 30%, incompatibility is evidenced by the formation on a non-homogenous gum base product. As such the use of polyvinyl acetate with SBR elastomers has been limited. The stability of SBR formulations is comparatively less than other synthetic elastomers primarily resulting from its oxidation on prolonged storage as is or when present in gum base formulations. In addition, SBR catalyzes the oxidation reaction of various flavoring liquids, such as peppermint oil and citrus flavors.

Similar to the stability deficiencies of SBR gum compositions such compositions normally require several days of curing prior to forming the compositions into discrete pieces for wrapping.

Various efforts have been made to replace the styrene-butadiene copolymer elastomer in chewing gum with alternate elastomers that do not exhibit the same deficiencies of SBR. One of the first formulations is described by Comollo in U.S. Pat. No. 3,984,574.

The Comollo patent discloses a non-tack chewing gum which contains as the preferred elastomer a low molecular weight polyisobutylene (molecular weight of 6,000 to 12,000), and/or a higher molecular weight polyisobutylene (molecular weight of 40,000 to 120,000). It is also disclosed that other elastomers may be employed in place of or together with the polyisobutylene, namely, polyisoprene, a copolymer of isobutylene and isoprene, or the copolymer of butadiene and styrene. Comollo indicates in Column 7 beginning at line 7 that it was discovered that combinations of natural gums, natural resins, rosin derivatives and resins of waxes of petroleum origin, natural gums, natural or synthetic rubbers, and resins, and natural gums, natural or synthetic rubbers and waxes, or combinations of rubbers, waxes and resins produce inherently tacky chewing gum bases and such combinations should be avoided. In addition to the references elastomers, the Comollo chewing gum contains hydrogenated vegetable oils or animal fats, mineral adjuvants, such as calcium carbonate, talc or tricalcium phosphate, polyvinyl acetate having a molecular weight of at least 2,000, and fatty acids, such as stearic and palmitic acid, and mono and diglycerides of fatty acids.

Another non-SBR composition is disclosed by Cherukuri et al in U.S. Pat. No. 4,352,822. This patent discloses the use of polyisobutylene elastomers to make a bubble gum having film forming characteristics. The elastomer gum base used a combination of essential ingredients including glyceryl triacetate and acetylated monoglyceride as plasticizers, a polyterpine resin as an anti-tack agent, polyethylene wax and various other conventional chewing gum additives.

U.S. Pat. No. 4,357,355 to Koch et al is likewise directed to a non-stick bubble gum base composition that can contain non-SBR elastomers. In particular, this patented non-adhesive bubble gum base composition includes a high molecular weight vinyl polymer such as polyvinyl acetate or polyvinyl alcohol, together with an emulsifier, in combination with ingredients such as an elastomer, an oleaginous plasticizer, an elastomer solvent, mineral adjuvants, fatty acids, and others.

While the prior art compositions have been effective to make non-stick or tack free bubble gums, none of these non-SBR formulations have been effective for preparing stable conventional chewing gums. It would thus be beneficial to prepare a non-SBR chewing gum having the combined benefits of easy processing, improved stability and extended flavor sensation.

In accordance with the present invention a chewing gum composition having extended stability of flavor taste and decreased auto-oxidation potential has been unexpectedly developed from a unique combination of elastomers, elastomer solvent, polyvinyl acetate, waxes, and glyceryl monostearate.

The chewing gum compositions of this invention exhibit rapid processing resulting from a rapid setting base formulation and easy processing and handling resulting from the compositions soft and pliable chewing gum consistency. In addition, the resulting chewing gum compositions have a consistent chew, that is a uniform chew character throughout the chewing period coupled with a higher level of flavor stabilization. The chewing gums also have long storage stability without product deterioration. When the compositions are chewed, a soft chew characteristic is evidenced along with an even flavor/sweetness release.

The elastomers useful in the chewing gum formulation include a mixture of isobutylene isoprene copolymer and polyisobutylene. The isobutylene isoprene copolymer represents commercially available material available from a number of suppliers. This material is used in combination with polyisobutylene which has a preferred low molecular weight, normally from 37,000 to about 87,000 (determined by the Flory method). The low molecular weight polyisobutylene component may be used as a single polyisobutylene material or combination of different polyisobutylene compounds provided each has a molecular weight within the range defined. The use of a combination of elastomers has been found essential to achieve a chewing gum composition having the desired elasticity and texture.

The total elastomer content employed is in an amount of about 0.5% to about 30% by weight of the gum base and preferably from about 5% to about 20% by weight of the gum base. The elastomer mixture may contain from about 2% to about 12% by weight isobutylene isoprene copolymer and about 2% to about 20% by weight polyisobutylene. When the total amount of elastomer is below 0.5% the composition lacks elasticity, and cohesiveness whereas at amounts above 30% the formulation is hard and rubbery.

In addition to the essential presence of the elastomer mixture, the chewing gum composition may contain any natural water-insoluble gum base well known in the art. For example, those polymers which are suitable include, without limitation, substances of vegetable origin such as chicle, jelutong, gutta percha and crown gum. In general, amounts of about 0% to about 10% by weight of the final chewing gum composition are acceptable with preferred amounts being from about 0.5% to about 2.5% by weight.

The gum base composition contains elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin; terpene resins including polyterpene and polymers of α-pinene or β-pinene and mixtures thereof. The elastomer solvent may be employed in an amount ranging from about 3% to about 55% and preferably about 8% to about 38% by weight of the gum base. Amounts below about 3% cause the chew characteristic to be hard and result in inconsistent flavor release. Amounts above 55% cause a soft product to be formed which destroys the chew characteristic.

Vinyl polymers, and in particular polyvinyl acetate (PVA) is an essential ingredient. The preferred PVA has a molecular weight of at least 2,000. Such materials are commercially available in various molecular weights which can be successfully used. The polyvinyl acetate is employed in amounts of about 5% to about 45% by weight and preferably 7% to 35% by weight. These materials when used in such high amounts aid in extending the elastomer mixture while maintaining product integrity. Amounts below about 5% cause the base to be unstable and result in nonuniform flavor release. Amounts above 45% cause segregation of gum constituents to occur.

It is essential to employ glyceryl monostearate as an emulsifier. When absent the formulation has poor stability and lacks acceptance texture. It is believed that the glyceryl monostearate aids in bringing the normally immiscible constituents together in such a way that they form a single finely dispersed stable system. This emulsifier also simplifies the incorporation of flavors into the final base and aids in retaining finely divided solids to the gum base complex. The glyceryl monostearate is employed in amounts of about 1% to about 15% and preferably about 3% to about 9%. Additional emulsifiers may also be includes, notably lecithin, fatty acid and monoglycerides, diglycerides and, triglyceride, propylene glycol monostearate and mixtures thereof. Such materials may be used in the amount of about 1% to aout 25% by weight.

The gum base formulation must employ a wax material. The waxes have been found to soften the rubber elastomer mixture and improve elasticity of the chew character. The waxes employed are preferably microcrystalline wax, paraffin wax, and mixtures thereof. Useful amounts are from about 2% to about 25% by weight and preferably from about 2.5% to about 20% by weight of the gum base composition. Preferably these waxes are used in combination in amounts of about 5% to about 20% microcrystalline wax and about 3% to about 15% paraffin wax.

A variety of traditional ingredients such as plasticizers or softeners may optionally be added. Such materials are optional and not essential in the present formulation. Such materials include hydrogenated vegetable oils, lanolin, stearic acid, sodium stearate, potassium stearate, glyceryl triacetate, glycerine and the like and mixtures thereof. Such materials when incorporated into the gum base obtain a variety of desirable textures and consistency properties. These individual materials are generally employed in amounts of about 2% to about 25% by weight and preferably in amounts of from about 1.5% to about 12% by weight of the gum base composition. Because of the low molecular weight of these compounds, they are able to penetrate the fundamental structure of the base making it plastic and less viscous.

Optionally, bulking agents such as fillers may also be employed. Illustrative fillers may include calcium carbonate, talc, aluminum hydroxide, alumina, aluminum silicates, calcium phosphates (anhydrous and dihydrate) and combinations thereof. Preferably the amount of filler when used will vary up to about 50% by weight of the chewing gum base.

The manner in which the base constituents are blended is not critical and is performed using standard techniques and equipment known to those skilled in the art. In a typical embodiment a premixture may be prepared by initially softening a previously mixed elastomer composition by agitating it with an elastomer solvent and/or plasticizers, and/or emulsifiers for a period of about 30 minutes to about 120 minutes, once initial mixing is complete the remaining base constituents may be added in bulk, incrementally or stepwise while the resulting mixture is blended for a further equivalent period of time. Once blending is complete, the remaining chewing gum composition additives may be added to the prepared base to form a final chewing gum composition by standard techniques.

The present chewing gum base may be formulated into a variety of chewing gum products utilizing standard procedures and equipment. A chewing gum composition may be prepared by combining conventional ingredients such as sweeteners, flavors, colorants and the like.

The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, sugar, maltose, partially hydrolyzed starch, or corn syrup solids and sugar alcohols such as sorbitol, xylitol, mannitol and mixtures thereof.

B. Water-soluble artificial sweeteners such as the soluble saccharin salts, i.e., sodium or calcium saccharin salts, cyclamate salts, acesulfam-K and the like, and the free acid form of saccharin.

C. Dipeptide based sweeteners such as L-aspartyl-L-phenylalanine methyl ester and materials described in U.S. Pat. No. 3,492,131 and the like.

In general, the amount of sweetener will vary with the desired amount of sweetners selected for a particular chewing gum. This amount will normally be 0.01% to about 90% by weight when using an easily extractable sweetener. The water-soluble sweeteners described in category A above, are preferably used in amounts of about 25% to about 75% by weight, and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

The chewing gum composition of this invention may additionally include the conventional additives of coloring agents such as titanium dioxide; emulsifiers such as lecithin and glyceryl monostearate; and additional fillers such as aluminum hydroxide, alumina, aluminum silicates, calcium carbonate, and talc and combinations thereof. Preferably the amount of total fillers when used will vary from about 0% to about 30% by weight of the final gum composition.

Flavoring agents well known to the chewing gum art may be added to the chewing gum compositions of the instant invention. These flavoring agents may be chosen from synthetic flavoring liquids and/or oils derived from plants, leaves, flowers, fruits and so forth, and combinations thereof. Representative flavoring liquids include: spearmint oil, cinnamon oil, oil of wintergreen (methylsalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed is normally a matter of preference subject to such factors as flavor type, base type and strength desired. In general, amounts of about 0.05% to about 3.0% by weight of the final chewing gum composition are usable with amounts of about 0.3% to about 1.5% being preferred and about 0.7% to about 1.2% being most preferred.

The finished chewing gum containing the flavoring agent unexpectedly exhibits enhanced flavor stability over prolonged periods. This effect is believed to occur from a reduced auto-oxidative potential present in the chewing gums of the invention resulting from the absence of SBR elastomers and the unique combination of ingredients used in the present invention. This reduced auto-oxidative potential is quite important when preparing chewing gum compositions using flavoring agents that undergo oxidative reactions within the formulation. Flavoring agents that primarily undergo such reactions include peppermint oil and citrus flavors, such as lemon, orange, grape, lime and grapefruit.

A disadvantage associated with the use of such oils in the past has been their degradation during storage resulting in change in odor and flavor properties. Several studies have undertaken to identify the aging characteristics of peppermint oil.

One study is described by R. H. Reitsema, et al. in *Oxidation of Peppermint Oil*, Industrial and Engineering Chemistry, Vol 44, page 176, January 1952, wherein three reactions are described as contributing to the aging process. The first reaction is the isomerization of terpenes which is described as having only minor importance. The second reaction involves the polymerization of the oil constituents which is noted as increasing the oils molecular weight and the viscosity of the resulting product. And thirdly, the most important reaction is identified as the oxidation of the peppermint oil which affects aging of the oil from a flavor standpoint. Specific components involved in the oxidation aging process include the pinenes, limonene and menthofuran.

Various attempts have been made to inhibit the oxidation process to prevent the formation of oxidative by-products commonly referred to as "off-note" material. One conventional technique involves the use of antioxidants in the peppermint oil in an effort to inhibit the reaction from occurring. The use of such antioxidants, however, have not been successful since they are either not effective in suppressing the oxidation reaction over prolonged storage conditions or they have resulted in the formation of "off-note" peppermint oil detracting from the flavoring agent properties. These processes at best have merely attempted to mask the oxidation process by-products without removing the oxidative constituents from the oil themselves.

In contrast, in view of the reduced auto-oxidative potential attributable to the instant formulation, use of conventional antioxidants is possible without formulation of "off-note" material while maintaining prolonged storage conditions. Useable autioxidants and preservatives may include those materials conventionally utilized in chewing gum compositions such as butylated hydroxyanisole, butylated hydroxy toluene, propyl gallate and the like.

The chewing gum formulations are prepared by conventional methods. An illustrative process involves first melting the gum base at a temperature from about 70° C. to about 120° C. and mixing the gum base in a kettle with a liquid softener and/or a emulsifier for 2 to 8 minutes. To this mixture ⅔ to ¾ of the sugar ingredients and colors are added and mixing is continued for 1 to 4 minutes. To this mixture the remaining sugar ingredients are added and while mixing is continued, the flavoring agent is slowly added. Mixing is maintained for 1 to 4 minutes. To this mixture a humectant can be added and mixing is continued for 1 to 4 minutes. The gum is discharged from the kettle and formed into its desired shape such as strips, slabs, chunks, balls, ropes and/or center filled.

A preferred process for preparing a flavored chewing gum composition comprises admixing the chewing gum base at a temperature from between 70° C. to 120° C. with the flavoring agent, continuing the mixing until a uniform mixture of gum base and flavoring is obtained and thereafter forming the mixture into suitable chewing gum shapes, said flavoring agent comprises natural or synthetic oils and said chewing gum base prepared from an elastomer mixture of isobutylene isoprene copolymer and polyisobutylene, elastomer solvent, polyvinyl acetate, glyceryl monostearate, and waxes.

The following examples are given to illustrate the invention, but are not deemed to be limiting thereof. All percentages given throughout the specification are based upon weight unless otherwise indicated, percentages of base components are by weight of the base, whereas chewing gum composition components are by weight of the final chewing gum formulation.

EXAMPLES

These examples demonstrate the difference of SBR gum base to non-SBR gum base. These gum bases are used to make identical gums which are used to demonstrate the invention.

COMPARATIVE A

The following demonstrates how to prepare an SBR base as in Table 1.

To a kettle is added a premix which is composed of Butadiene-Styrene Copolymer, Hydrogenated Vegetable Oil, Glycerol Ester of Polymerized resin and Emulsifier. Mix 15 minutes in which time the melted mass reaches approximately 190° F. To this mixture is added in sequential manner, filler, polyvinyl acetate, wax, antioxidant and emulsifier while mixing is continued. The final temperature should range from 180° F. to 210° F. The molten mass is discharged from the kettle into coated pans. The base is allowed to cool and harden before depanning.

COMPARATIVE B

The following demonstrates how to prepare an SBR base as in Table 1.

Add to a kettle a premix which is composed of Butadiene-Styrene Copolymer, Hydrogenated Vegetable Oil, Glycerol Ester of Polymerized Resin and Emulsifier. Mix 15 minutes, in which time the melted mass reaches approximately 190° F. To this mixture is added in sequence the Glycerol Ester of Polymerized Resin and Glyceryl Ester of partially Hydrogenated Wood Rosin, Pentaerythritol Ester of partially Hydrogenated Wood Resin, Polyvinyl Acetate, Hydrogenated Vegetable Oil, antioxidant, Emulsifer and wax while mixing is continued. Final temperature should range from 180° F. to 210° F. The molten mass is discharged from the kettle into coated pans. The base is allowed to cool and harden before depanning.

| Ingredient | COMPARATIVE TABLE 1 | |
|---|---|---|
| | A | B |
| Butadiene-Styrene Copolymer | 10.00 | 10.49 |
| Filler | 14.88 | — |
| Pentaerythritol Ester of Partially Hydrogenated Wood Resin | — | 20.94 |
| Glyceryl Ester of Partially Hydrogenated Wood Rosin | 11.88 | 5.47 |
| Glycerol Ester of Polymerized Resin | 9.08 | 10.85 |
| Polyvinyl Acetate | 21.82 | 22.88 |
| Waxes | 13.47 | 10.94 |
| Emulsifier | 8.94 | 7.46 |
| Hydrogented Vegetable Oil | 10.00 | 10.96 |
| Antioxidant | 1000 ppm | 1000 ppm |

Inventive Example 1

Inventive Runs A to F

The following example demonstrates how to prepare a Non-SBR base as in Table 2—Examples 'A' through 'F':

Add to the kettle a premix which is composed of Isobutylene-Isoprene Copolymer, Glycerol Ester of Polymerized resin and paraffin wax. Mix 15 minutes in which time the melted mass reaches approximately 190° F. To this mixture is added in sequence Glycerol Ester of Polymerized Resin; Glyceryl Ester of partially Hydrogenated Wood Rosin; Polyvinyl acetate; Polyisobutylene; wax; Hydrogenated vegetable oil; Glycerol Monostearate, waxes, filler, and the antioxidant while mixing is continued. Final temperature should range from 180° F. to 210° F. The molten mass is discharged from the kettle into coated pans. The base is allowed to cool and harden before depanning.

Inventive Example 2

Inventive Run G

The following example demonstrates how to prepare a Non-SBR base as in Table 2—Example 'G':

Add to the kettle a premix which is composed of Isobutylene-Isoprene Copolymer, Terpene Hydrocarbon resin and paraffin wax. Mix 15 minutes in which time the melted mass reaches approximately 190° F. To this mixture is added in sequence the Terpene Hydrocarbon Resin and Filler; Glyceryl Ester of partially Hydrogenated Wood Rosin; Polyvinyl acetate; Polyisobutylene; wax; Hydrogenated vegetable oil; Glyceryl Monostearate, filler and antioxidant while mixing is continued. Final temperature should range from 180° F. to 210° F. The molten mass is discharged from the kettle into coated pans. The base is allowed to cool and harden before depanning.

TABLE 2

| Ingredient | INVENTIVE EXAMPLES | | | | | | |
|---|---|---|---|---|---|---|---|
| | A | B | C | D | E | F | G |
| Isobutylene-Isoprene Copolymer | 5.0 | 5.0 | 7.0 | 5.0 | 5.5 | 5.0 | 5.0 |
| Polyisobutylene | 7.0 | 7.0 | 7.0 | 7.0 | 3.5 | 9.0 | 9.0 |
| Polyvinyl Acetate | 20.0 | 22.0 | 22.0 | 20.0 | 18.0 | 24.0 | 24.0 |
| Glyceryl Ester of Partially Hydrogenated Wood Rosin | 26.0 | 16.0 | 13.0 | 26.0 | 22.0 | 27.0 | 15.0 |
| Glycerol Ester of Polymerized Resin | 7.0 | 7.0 | 10.0 | 7.0 | 5.5 | 7.0 | — |
| Hydrogenated Vegetable Oil | 5.0 | 5.0 | 5.0 | 5.0 | 8.0 | 5.0 | 4.0 |
| Polyterpene Resin | — | — | — | — | — | — | 10.0 |
| Microcrystalline Wax | 12.0 | 11.0 | 18.0 | 9.0 | 6.5 | 12.0 | 7.0 |
| Paraffin Wax | 7.0 | 6.0 | — | — | 12.0 | 7.0 | 5.0 |

TABLE 2-continued

| | INVENTIVE EXAMPLES | | | | | | |
|---|---|---|---|---|---|---|---|
| Ingredient | A | B | C | D | E | F | G |
| Glyceryl Mono Stearate | 4.0 | 3.6 | 4.0 | 3.6 | 5.0 | 4.0 | 3.33 |
| Filler | 7.0 | 17.4 | 18.0 | 17.4 | 14.0 | — | 17.67 |
| Antioxidant | 1000 ppm | 1000 ppm | 1000 ppm | 1000 ppm | 1000 ppm | 1000 ppm | 1000 ppm |

Inventive Example 3 and Comparative Examples

The following Examples demonstrate how to make conventional chewing gums from the gum bases recited in Table 1 and Table 2.

Chewing gum formulations are prepared with the ingredients cited in Table 3. The formulations were prepared by first melting the gum base at a temperature from 82° C. to 94° C. and mixing the gum base in a kettle with the corn syrup and lecithin. Mixing is continued for approximately 6 minutes to obtain a homogeneous mixture. To this mixture is then added ⅔ sugar, dextrose and color. Mixing is continued for approximately 3 minutes. The remaining ⅓ sugar is added and while mixing is continued, the flavor is slowly added. Mixing is maintained for approximately 4 minutes, at which time the Glycerin is added and mixing is continued for an additional 3 minutes. The gum is then discharged from the kettle and formed into strips having a thickness of 0.18 centimeters and cooled to room temperature.

The formulations were subjected to test panel studies with multiple panelists. The results demonstrated a controlled release of flavor and sweetness from the gums made with non-SBR bases as recited in Table 2 vs. the flavor and sweetness release found from the gums made with SBR gum bases as recited in Table 1.

The formulations were subjected to stability analysis. This is accomplished by placing the gums in a controlled incubator at 37° C. for an extended period of time, such as 1 week through 8 week time stations. Once removed from the incubator, the gums were subjected to test panel studies with multiple panelists. The results demonstrated an increased peppermint stability found in the gums made with gum base (non SBR) as cited in Table 2 vs. the stability of the gums made with gum bases (SBR) as cited in Table 1.

TABLE 3

| INGREDIENT | PERCENTAGE USAGE |
|---|---|
| Gum Base | 21.0 |
| Corn Syrup (44° Be) | 16.0 |
| Sugar (powdered) | 55.4 |
| Dextrose | 6.0 |
| Glycerin | 0.45 |
| Lecithin | 0.2 |
| Color | 0.1 |
| Flavor (peppermint oil) | 0.85 |

Inventive Example 4 and comparative Examples

Chewing gum formulations are prepared with the ingredients cited in Table 4. The formulations were prepared by first melting the gum base at a temperature from 82° to 94° C. and mixing the gum base in a kettle with the corn syrup and lecithin. Mixing is continued for approximately 6 minutes to obtain a homogeneous mixture. To this mixture is then added ⅔ sugar, dextrose and color. Mixing is continued for approximately 3 minutes. The remaining ⅓ sugar is added and while mixing is continued, the flavor is slowly added. Mixing is maintained for approximately 4 minutes, at which time the Glycerin is added and mixing is continued for an additional 3 minutes. The gum is then discharged from the kettle and formed into strips having a thickness of 0.18 centimeters and cooled to room temperature.

The formulations were subjected to test panel studies with multiple panelists. The results demonstrated a controlled release of flavor and sweetness from the gums made with non-SBR bases as recited in Table 2 vs. the flavor and sweetness release found from the gums made with SBR gum bases as recited in Table 1.

The formulations were also subjected to stability analysis. This is accomplished by placing the gums in a controlled incubator at 37° C. for an extended period of time, such as 1 week through 8 week time stations. Once removed from the incubator, the gums were subjected to test panel studies with multiple panelists. The results demonstrated an increased flavor stability found in the gums made with gum base (non SBR) as cited in Table 2 vs. the stability of the gums made with gum bases (SBR) as cited in Table 1.

TABLE 4

| INGREDIENT | A | B | C | D | E | F | G |
|---|---|---|---|---|---|---|---|
| Gum Base | 21.0 | 21.0 | 21.0 | 21.0 | 20.5 | 20.0 | 22.0 |
| Sugar | 54.42 | 54.25 | 54.45 | 54.4 | 54.95 | 55.25 | 53.25 |
| Corn Syrup | 17.0 | 17.0 | 17.0 | 17.0 | 17.0 | 17.0 | 17.0 |
| Dextrose | 6.0 | 6.0 | 6.0 | 6.0 | 6.0 | 6.0 | 6.0 |
| Color | 0.1 | 0.1 | 0.1 | 0.1 | 0.1 | 0.1 | 0.1 |
| Flavor | 0.83 | 1.0 | 0.8 | 0.85 | 0.8 | 1.0 | 1.0 |
| Glycerin | 0.45 | 0.45 | 0.45 | 0.45 | 0.45 | 0.45 | 0.45 |
| Lecithin | 0.2 | 0.2 | 0.2 | 0.2 | 0.2 | 0.2 | 0.2 |
| **Type | Fruit Natural and Artificial | Cinnamon | Methyl Salicilate | Spearmint | Fruit Natural | Strawberry | Artificial Fruit |

This invention being thus described, it will be obvious that the same may be varied in many ways. Such variations are not to be regarded as a departure from the spirit and scope of the invention and all such modifications are intended to be included within the scope of the following claims.

What is claimed is:

1. A chewing gum composition having extended flavor taste stability which comprises a chewing gum base having decreased auto-oxidative potential and a flavoring agent, wherein the chewing gum base consisting essentially of:
   (a) about 0.5% to about 30% by weight non-SBR elastomer comprising a mixture of isobutylene isoprene copolymer and polyisobutylene having a molecular weight between 37,000 and 80,000 wherein the elastomer mixture comprises about 2% to about 12% by weight isobutylene isoprene copolymer and about 2% to about 20% polyisobutylene;
   (b) about 8% to about 38% by weight elastomer solvent;
   (c) about 5% to about 45% by weight polyvinylacetate;
   (d) about 1% to about 15% by weight glyceryl monostearate emulsifier; and
   (e) about 0.5% to about 25% by weight waxes.

2. The chewing gum base composition of claim 1 wherein the flavoring agent is present in the amount of about 0.05% to about 3.0% by weight.

3. The composition of claim 1 wherein the elastomer is present in the amount of about 5% to about 20% by weight.

4. The composition of claim 1 wherein the polyvinyl acetate is present in the amount of about 7% to about 35% by weight.

5. The composition of claim 1 wherein the emulsifier is present in the amount of about 3 to about 9% by weight.

6. The composition of claim 1 wherein the waxes are present in the amount of about 2.5% to about 20% by weight.

7. The chewing gum base composition of claim 1 were in the waxes are selected from the group consisting of microcrystalline wax, paraffin wax and mixtures thereof.

8. The chewing gum composition of claim 1 wherein the flavoring agent comprises natural or synthetic oils.

9. The chewing gum composition of claim 1 wherein the flavoring agent is selected from the group consisting of peppermint oil, spearmint oil, cinnamon oil, oil of wintergreen, bubble flavor, fruit flavors and mixtures thereof.

10. The chewing gum composition of claim 1 which additionally contains a material selected from the group consisting of natural or synthetic gums, sweeteners, fillers, coloring agents and mixtures thereof.

11. The flavoring composition of claim 10 wherein the sweetener is selected from the group consisting of water-soluble sweetening agents, water-soluble artificial sweeteners, dipeptide based sweeteners, and mixtures thereof.

12. A process for preparing a flavored chewing gum composition which comprises admixing a chewing gum base at a temperature from about 70° C. to 120° C. with a flavoring agent, continuing the mixing until a uniform mixture of gum base and flavoring is obtained and thereafter forming the mixture into suitable chewing gum shapes, said flavoring agent comprising artificial, natural or synthetic oils and said chewing gum base consisting essentially of:
   (a) about 0.5% about 30% by weight non-SBR elastomer comprising a mixture of isobutylene isoprene copolymer and polyisobutylene having a molecular weight between 37,000 and 80,000;
   (b) about 8% to about 38% by weight elastomer solvent;
   (c) about 5% to about 45% by weight polyvinylacetate;
   (d) about 1% to about 16% by weight glycerylmonostearate emulsifier; and
   (e) about 2% to about 25% by weight waxes.

* * * * *